July 3, 1956  J. S. PILCH  2,752,836
TRACTOR IMPLEMENT HITCH
Filed June 22, 1954
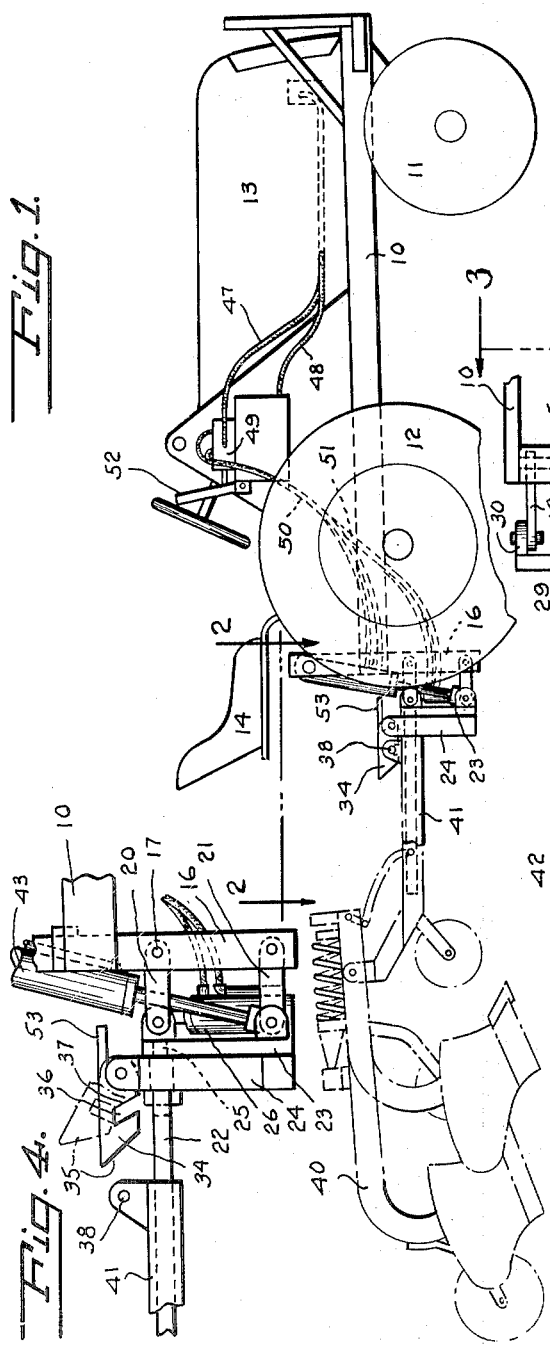
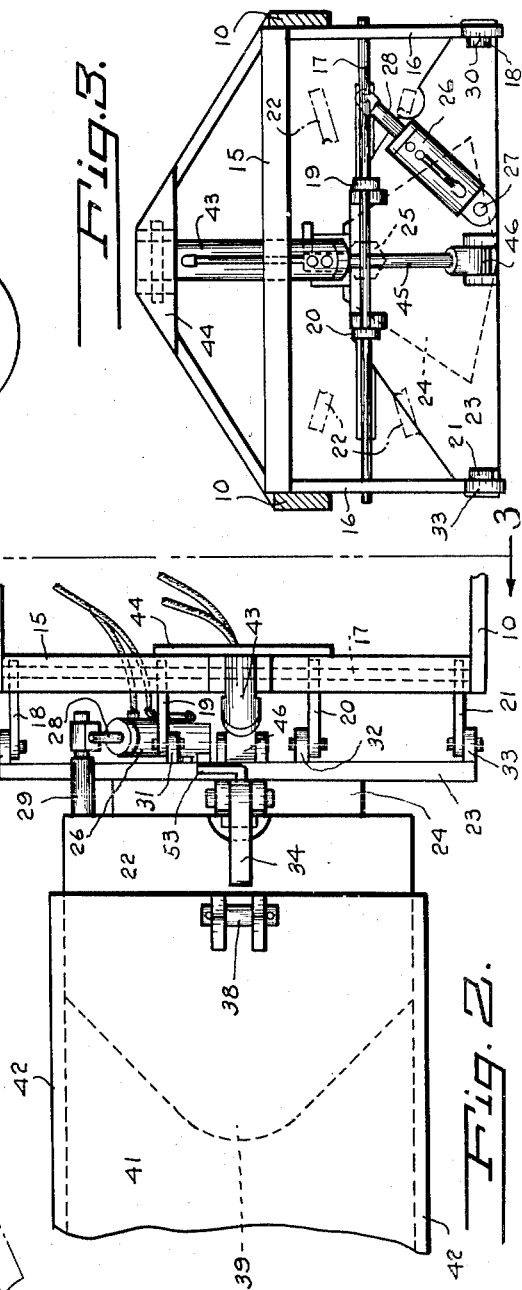
INVENTOR.
JOHN S. PILCH
BY
Raymond A. Paquin
ATTORNEY.

United States Patent Office 2,752,836
Patented July 3, 1956

2,752,836

TRACTOR IMPLEMENT HITCH

John S. Pilch, Ware, Mass.

Application June 22, 1954, Serial No. 438,414

5 Claims. (Cl. 97—47.14)

This invention relates to tractor mounted implements and more particularly, the invention concerns mechanism by which the implements may be attached or coupled to and controlled from a tractor.

The object and general nature of the present invention is the provision of an arrangement whereby the tractor mounted implement may be easily and quickly connected with and disconnected from the tractor.

More particularly, it is a feature of the invention to provide such an arrangement whereby an implement may be connected with or disconnected from its supporting tractor with a minimum of time and effort.

It is an object of the present invention to provide a new and improved arrangement whereby an implement may be easily and quickly connected to and disconnected from a tractor.

Another object of the invention is to provide a device of the type set forth which is less expensive and easier to use than prior devices of this type.

Another object is to provide a device of the type set forth having new and improved means for leveling or aligning of the implement and tractor.

Another object is to provide a device of the type set forth whereby an implement may be easily and quickly attached or coupled to a tractor by merely backing the tractor a short distance with automatic engagement between the tractor and the implement and whereby the implement may be easily and quickly disconnected from the tractor.

Another object is to provide a device of the type set forth which allows the implement and tractor attaching means to be adjusted to desired angular relationship relative to the ground.

Other objects and advantages of the invention will be apparent from the following description taken in connection with the accompanying drawings. It will be understood that changes may be made in the details of construction and arrangement of parts shown and described without departing from the spirit of the invention, as the preferred form has been given by way of illustration only.

Referring to the drawings:

Fig. 1 is a side view of a tractor and implement connected thereto according to the invention;

Fig. 2 is a fragmentary top view on an enlarged scale taken on line 2—2 of Fig. 1, looking in the direction of the arrows;

Fig. 3 is a sectional view taken on line 3—3 of Fig. 2, looking in the direction of the arrows; and Fig. 4 is a fragmentary side view on an enlarged scale of the attaching means.

Referring more particularly to the drawings, wherein similar reference characters designate corresponding parts throughout the several views, there is shown a tractor having a frame 10, front wheels 11, rear wheels 12, engine 13 and operator's seat 14.

The tractor frame 10 includes the connecting member 15 connecting the sides of the frame 10 adjacent their rear extremities and the supports 16 extending downwardly from the opposite sides of said support 15.

The supports 16 have the rod 17 extending therebetween and on rod 17 are positioned the rearwardly extending pivotally mounted supports 19 and 20 adapted to support projection or platform 22 by means of plate 23 which is rigidly secured to plate 24 to which is pivotally mounted plate 22 by means of pivot 25. The rearwardly extending pivotally mounted links 18 and 21 are pivotally connected to the pivots 30 and 33 respectively on plate 23 and to the opposite supports 16.

A cylinder 26 is secured at one end 27 to plate 23 and has the ram 28 extending from its opposite end pivotally connected to rod 29 which is fixed on platform 22 whereupon movement of ram 28 in cylinder 26 will effect pivotal movement of platform 22.

Plate 23 is secured to the supports 18, 19, 20 and 21 by means of lugs 30, 31, 32 and 33 respectively by pivotal connections and the connecting links 18, 19, 20 and 21 are pivotally mounted at both ends so that lifting movement by cylinder 43 and ram 45 will lift platform 22 in a substantially parallel movement, that is, the platform 22 can be lifted without any substantial change of angle because of the parallel motion mechanism described the parallel motion mechanism shown is illustrative and other parallel motion mechanisms may, of course, be substituted for the linkage shown.

On plate 24 is pivotally mounted the dog or catch 34 having the tapered rear edge 35 and the locking portion 36 having a tapered front side 37 which is tapered forwardly from the top to the bottom whereby when the lock pin 38 is in slot 36, movement of the tractor in a rearward direction will tend to unlock or disconnect the catch 34 from lock pin 38.

Platform 22 has a single nose or projection 39 which is preferably rounded or curved, as shown in Fig. 2, for easy engagement with the platform 41.

In the drawings, a plow 40 has been shown by way of illustration although it is understood that various other implements can also be employed with the same hitch arrangement.

The hitch for the plow, or other implement, comprises the platform 41 having the edges formed with lips or flanges 42 and adapted to receive the platform 22 in telescoping relation with said platform 41.

The platform 22 may be raised or lowered by means of cylinder 43 which is secured at its upper end to support 44 carried by tractor frame 10 and into cylinder 43 extends ram 45 which is connected at its lower end 46 to plate 23 for pivoting plates 23 and 24 and platform 22, as a unit, about pins between the lugs 30, 31, 32 and 33 and the projections 18, 19, 20 and 21, respectively.

The tractor is provided with a hydraulic pump which supplies fluid under pressure through lines 47 and 48 to control valve 49 which in turn supplies fluid through lines 50 and 51 to the respective cylinders which may be controlled through the operating levers 52.

It will be seen that with the platform 22 pivotable respective to platform 23 by means of cylinder 26, that the platform 22 may be angularly aligned with platform 41 for connection therewith or to maintain the platform 41 level with the ground.

To couple the tractor to the implement 40, the tractor is backed toward the implement with the platform 22 aligned with the platform 41 a short distance to allow the hook or catch 34 to automatically lock the platforms in engaged relation. The platform 22 may then be raised or lowered, as desired, for placing the implement 40 in proper operating position.

To disengage the implement 40 from the tractor, the tractor is backed a short distance towards the implement whereupon the tapered edge 37 of catch 34 will pivot the catch out of operative position and thereby assist in unlocking the connection between the tractor and implement or, if desired, the operator may disengage the tractor from the implement by pivoting catch or dog 34 by pressing downward on projection 53 of the catch with his foot or hand, if desired.

The harder the pull by the tractor on the implement, the tighter the connection between dog 34 and pin 38 because of the shape of slot 36. To eliminate any play due to wear, it is only necessary to replace the simple, easily replaceable pin 38.

It will be seen that by use of the cylinder 26 and ram 28 for pivoting the platform 22, that the platforms could be tilted and still operate up to a total of at least 120°, that is, 60° in each direction which will facilitate uses of the implement for certain uses such as hillside work, ditching with a grader blade, windrowing for planting and other uses.

The principal feature of the invention is to provide a connection between a tractor and an implement in which there is provided but a single projection on the tractor to engage with a single platform on the implement and requiring but a single hook or dog for retaining the projection and platform in operative relation.

It will be seen from the foregoing that I have provided simple, economical and inexpensive means for obtaining all of the objects and advantages of the invention.

I claim:

1. In a device of the character described for connecting an implement to a tractor, a substantially flat platform connected to an implement, a substantially flat platform connected to said tractor, said platforms being adapted to be positioned in telescoping relation and means for locking said platforms in said telescoping relation and parallel motion mechanism for raising said tractor platform relative to said tractor, said parallel motion mechanism comprising a supporting plate for said tractor platform, pivot means extending longitudinally of the tractor for pivotally mounting said supporting plate to said tractor and hydraulic means connected to said supporting plate and to said tractor for raising and lowering said plate and platform relative to said tractor and means for adjusting said supporting plate on its pivotal mounting.

2. In a device of the character described to couple a tractor to an implement, a support mounted on said tractor, pivot means mounted on said support and extending generally longitudinally of said tractor, a broad flat platform mounted on said pivot, means to raise and lower said platform parallel to itself, a broad flat complementary platform mounted on said implement so constructed and arranged that said platforms may telescopingly and rigidly engage each other, and means mounted on said support and connected to said first mentioned broad flat platform to positively adjust the angular position of said first mentioned platform on said pivot whereby the platform may be angularly aligned to facilitate coupling.

3. The device of claim 1 in which said platform connected to said tractor has a rearwardly tapered contour for guiding said platforms into said telescoping relation.

4. The device of claim 2 in which said platform connected to said tractor has a rearwardly tapered contour for guiding said platforms into said telescoping relation.

5. The device of claim 4 in which means are provided for locking said platform in said telescoping relation, said locking means comprising a catch on the upper surface of said implement platform and a dog pivotally mounted relative to said tractor platform.

References Cited in the file of this patent

UNITED STATES PATENTS

| | | |
|---|---|---|
| 730,777 | Krebs | June 9, 1903 |
| 1,384,944 | Flood | July 19, 1921 |
| 1,465,168 | Morris | Aug. 14, 1923 |
| 1,688,615 | Daniel | Oct. 23, 1928 |
| 1,864,639 | Crezee | June 28, 1932 |
| 2,351,473 | Benjamin | June 13, 1944 |
| 2,602,389 | Markel | July 8, 1952 |
| 2,612,826 | Williams | Oct. 7, 1952 |
| 2,701,510 | Altgelt | Feb. 8, 1955 |

FOREIGN PATENTS

| | | |
|---|---|---|
| 465,624 | Italy | Sept. 17, 1951 |
| 1,025,436 | France | Jan. 21, 1953 |